United States Patent
Nomura et al.

(10) Patent No.: US 8,827,854 B2
(45) Date of Patent: Sep. 9, 2014

(54) BEARING DEVICE, SPEED REDUCTION MECHANISM INCLUDING THE BEARING DEVICE, AND MOTOR TORQUE TRANSMISSION DEVICE

(75) Inventors: Keita Nomura, Kariya (JP); Hiroshi Takuno, Nukata-gun (JP); Takeshi Yamamoto, Izumisano (JP)

(73) Assignee: JTEKT Corporation, Osaka-shi (JP)

(*) Notice: Subject to any disclaimer, the term of this patent is extended or adjusted under 35 U.S.C. 154(b) by 203 days.

(21) Appl. No.: 13/603,871

(22) Filed: Sep. 5, 2012

(65) Prior Publication Data

US 2013/0065722 A1 Mar. 14, 2013

(30) Foreign Application Priority Data

Sep. 8, 2011 (JP) ................................. 2011-195762

(51) Int. Cl.
*F16H 3/70* (2006.01)
*F16C 19/00* (2006.01)
*B60K 1/00* (2006.01)
*F16H 57/04* (2010.01)
*B60K 17/356* (2006.01)
*F16H 1/32* (2006.01)

(52) U.S. Cl.
CPC .............. *F16H 57/0471* (2013.01); *B60K 1/00* (2013.01); *F16H 57/0486* (2013.01); *F16H 57/0428* (2013.01); *B60K 17/356* (2013.01); *F16H 2001/325* (2013.01); *B60K 2001/001* (2013.01)
USPC ......................................................... 475/170

(58) Field of Classification Search
USPC ................ 475/169–181; 384/437–475; 184/6
See application file for complete search history.

(56) References Cited

U.S. PATENT DOCUMENTS

| 1,455,360 | A | * | 5/1923 | Sharkey | 464/103 |
|---|---|---|---|---|---|
| 2,972,910 | A | * | 2/1961 | Menge, Sr. | 475/177 |
| 3,195,965 | A | * | 7/1965 | Dorn | 384/475 |
| 5,672,110 | A | * | 9/1997 | Kurita et al. | 464/37 |
| 6,328,478 | B1 | * | 12/2001 | Fukuda et al. | 384/475 |
| 8,529,135 | B2 | * | 9/2013 | Duffy et al. | 384/470 |
| 8,646,983 | B2 | * | 2/2014 | Hayashi et al. | 384/470 |

FOREIGN PATENT DOCUMENTS

JP 2007-218407 8/2007

* cited by examiner

*Primary Examiner* — Tisha Lewis
(74) *Attorney, Agent, or Firm* — Oblon, Spivak, McClelland, Maier & Neustadt, L.L.P.

(57) ABSTRACT

A cage of each of ball bearings arranged on respective outer peripheries of eccentric portions of a motor shaft has an annular base portion interposed between an inner ring and an outer ring and a plurality of partition wall portions for forming pockets together with the base portion. In a first ball bearing, part of the base portion protrudes axially outward from the inner raceway and forms an oil receiving portion that receives lubricating oil from the second rolling bearing side, at a portion around the rotation axis and axially outward of the first rolling bearing.

14 Claims, 6 Drawing Sheets

BEARING DEVICE, SPEED REDUCTION MECHANISM INCLUDING THE BEARING DEVICE, AND MOTOR TORQUE TRANSMISSION DEVICE

INCORPORATION BY REFERENCE

The disclosure of Japanese Patent Application No. 2011-195762 filed on Sep. 8, 2011 including the specification, drawings and abstract, is incorporated herein by reference in its entirety.

BACKGROUND OF THE INVENTION

1. Field of the Invention

The invention relates to a bearing device that is suitably used in, for example, an electric vehicle that has an electric motor serving as a driving source, a speed reduction mechanism that includes the bearing device, and a motor torque transmission device.

2. Description of Related Art

There is a conventional motor torque transmission device that is mounted in an automobile, and that includes an electric motor and a reduction-transmission mechanism (for example, see Japanese Patent Application Publication No. 2007-218407 (JP 2007-218407 A)). The electric motor generates motor torque. The reduction-transmission mechanism reduces the speed of rotation output from the electric motor and transmits driving force to a differential mechanism.

The electric motor has a motor shaft that is rotated by electric power from an in-vehicle battery. The motor shaft is arranged along the axis of the reduction-transmission mechanism. Eccentric portions are integrally formed on the outer periphery of the motor shaft. The central axis of each eccentric portion is an axis that is offset from the axis of the motor shaft by a predetermined eccentric amount.

The reduction-transmission mechanism has a pair of reduction-transmission units provided around the axis of the reduction-transmission mechanism, and a housing that accommodates the reduction-transmission units. The reduction-transmission mechanism is interposed between the electric motor and the differential mechanism, and is coupled to the motor shaft and the differential mechanism (differential case). One of the reduction-transmission units is coupled to the motor shaft, and the other one of the reduction-transmission units is coupled to the differential case.

With the above configuration, the motor shaft of the electric motor is rotated by electric power from the in-vehicle battery, and accordingly the motor torque is transmitted from the electric motor to the differential mechanism via the reduction-transmission mechanism and then distributed to right and left wheels by the differential mechanism.

The reduction-transmission units of the motor torque transmission device of this type have a pair of disc-shaped revolving members, a plurality of outer pins and a plurality of inner pins. The revolving members make revolving motions in accordance with the rotation of the motor shaft of the electric motor. The outer pins apply rotation force to the revolving members. The inner pins are arranged radially inward of the outer pins, and output the rotation force of the revolving members to the differential mechanism as driving force (torque).

The revolving members each have a center hole and a plurality of pin insertion holes. The revolving members are rotatably supported by the eccentric portions of the motor shaft via bearings (cam-side bearings). The central axis of each center hole coincides with the axis of a corresponding one of the eccentric portions of the motor shaft. The pin insertion holes are arranged at equal intervals around the central axis of each center hole.

The outer pins are arranged at equal intervals around the axis of the motor shaft, and are fitted to the housing of the reduction-transmission mechanism.

The inner pins are passed through the pin insertion holes of the revolving members. The inner pins are arranged at equal intervals on a circle around the axis of the rotation member at wheel side, and are fitted to the differential case. Bearings (pin-side bearings) are fitted to the inner pins. The bearings are used to reduce contact resistance between the inner pins and the inner peripheries which define the pin insertion holes of the revolving members.

However, in the motor torque transmission device described in JP 2007-218407 A, lubricating oil is concentrated on the outer side in the radial direction of the motor shaft by centrifugal force resulting from the revolving motions of the revolving members. This may cause a problem that an amount of lubricating oil near the motor shaft reduces and the lubricating oil is not sufficiently supplied to the bearings located on the inner side in the radial direction of the motor shaft.

SUMMARY OF THE INVENTION

It is an object of the invention to provide a bearing device in which an amount of lubricating oil on the inner side in the radial direction perpendicular to the rotation axis is increased to sufficiently supply the lubricating oil to a bearing near the rotation axis, a speed reduction mechanism including the bearing device, and a motor torque transmission device.

An aspect of the invention relates to a bearing device, including: a rotary shaft that has at least two eccentric portions that are arranged at equal intervals around a rotation axis of the rotary shaft, and that have respective central axes that are spaced apart at equal interval from the rotation axis in a radial direction of the rotary shaft; and at least two rolling bearings that include a first rolling bearing and a second rolling bearing, that are respectively arranged on outer peripheries of the at least two eccentric portions of the rotary shaft, and each of which includes a plurality of rolling elements that roll between an inner raceway and an outer raceway and a cage by which the rolling elements are rollably retained at equal intervals around the corresponding central axis. The cage of each of the at least two rolling bearings has an annular base portion that is interposed between the inner raceway and the outer raceway and a plurality of partition wall portions for forming pockets together with the base portion. In the first rolling bearing, part of the base portion protrudes axially outward from the inner raceway and forms an oil receiving portion that receives lubricating oil from the second rolling bearing side, at a portion around the rotation axis and axially outward of the first rolling bearing.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a motor torque transmission device according to an embodiment of the invention will be described in detail with reference to the accompanying drawings.

Figure 1:
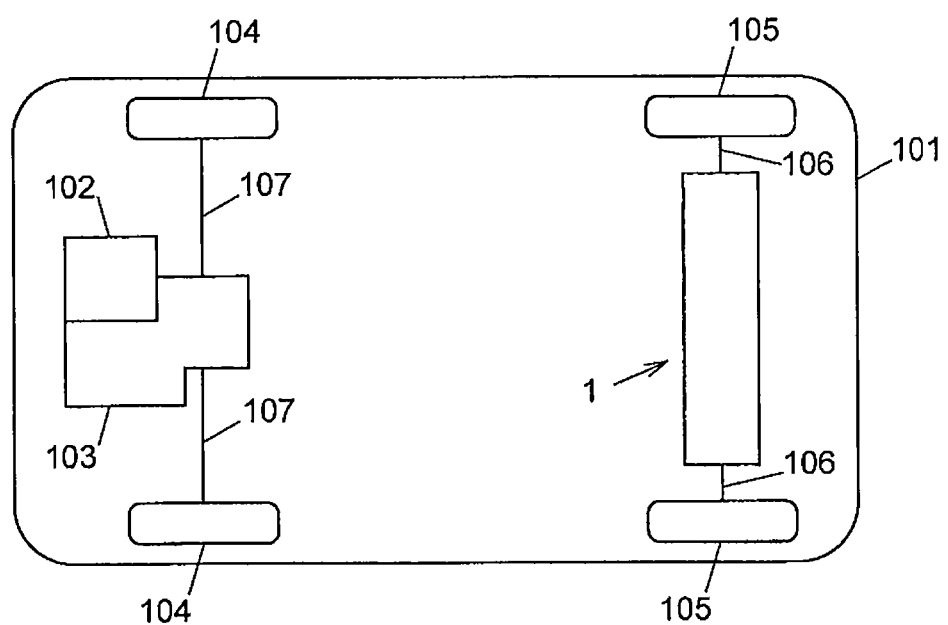
FIG. 1 is a plan view schematically illustrating a vehicle in which a motor torque transmission device according to an embodiment of the invention is mounted.

FIG. 1 schematically shows a four-wheel drive vehicle 101. As shown in FIG. 1, the four-wheel drive vehicle 101 has a front wheel power system that uses an engine as a driving source, and a rear wheel power system that uses an electric motor 4 as a driving source. The four-wheel drive vehicle 101 includes a motor torque transmission device 1, the engine 102, a transaxle 103, a pair of front wheels 104 and a pair of rear wheels 105.

The motor torque transmission device 1 is arranged in the rear wheel power system of the four-wheel drive vehicle 101, and is supported by a vehicle body (not shown) of the four-wheel drive vehicle 101.

The motor torque transmission device 1 is configured to transmit driving force based on the motor torque of the electric motor 4 to the rear wheels 105. Thus, the motor torque of the electric motor 4 is output to rear axle shafts 106 via a reduction-transmission mechanism 5 and a rear differential 3 (both will be described later in detail) to drive the rear wheels 105. The details of the motor torque transmission device 1, and the like, will be described later.

The engine 102 is arranged in the front wheel power system of the four-wheel drive vehicle 101. Thus, the driving force of the engine 102 is output to front axle shafts 107 via the transaxle 103 to drive the front wheels 104.

Figure 2:
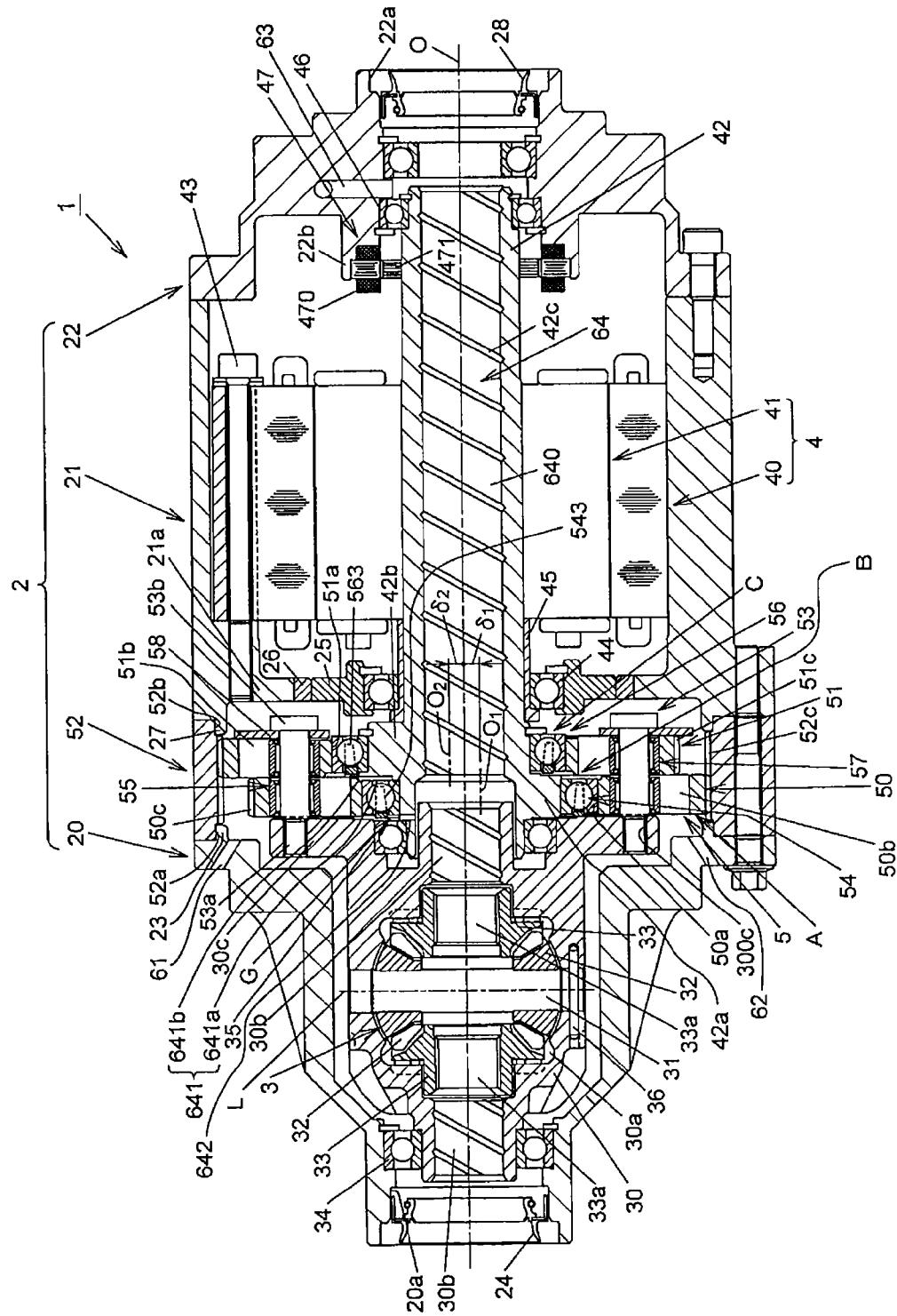
FIG. 2 is a sectional view illustrating the motor torque transmission device according to the embodiment of the invention.

FIG. 2 is an overall view of the motor torque transmission device. As shown in FIG. 2, the motor torque transmission device 1 is formed mainly of a housing 2, the rear differential 3, the electric motor 4 and the reduction-transmission mechanism 5. The axis of the housing 2 is a rotation axis O that coincides with the axis of each rear axle shaft 106 (shown in FIG. 1). The rear differential 3 is a driving force transmission target (i.e., a member to which driving force is transmitted) that distributes driving force based on the motor torque to the rear wheels 105 (shown in FIG. 1). The electric motor 4 generates motor torque for driving the rear differential 3. The reduction-transmission mechanism 5 reduces the speed of rotation output from the electric motor 4 and transmits driving force to the rear differential 3.

The housing 2 has a rotation force applying member 52 (described later in detail), a first housing element 20, a second housing element 21 and a third housing element 22. The housing 2 is arranged on the vehicle body. The first housing element 20 accommodates the rear differential 3. The second housing element 21 accommodates the electric motor 4. The third housing element 22 closes a first opening portion of the second housing element 21 (an opening portion on the opposite side of the second housing element 21 from a first housing element 20-side opening portion (second opening portion)).

The first housing element 20 is arranged at a second side (left side in FIG. 2) of the housing 2. The entirety of the first housing element 20 is formed of a stepped closed-end cylindrical member that is open toward the second housing element 21. The bottom of the first housing element 20 has a shaft insertion hole 20a through which one of the rear axle shafts 106 (shown in FIG. 1) is passed. An annular protrusion 23 that protrudes toward the second housing element 21 is formed integrally on the open end face of the first housing element 20. The outer periphery of the protrusion 23 has an outside diameter smaller than the maximum outside diameter of the first housing element 20, and is formed of a cylindrical surface of which the central axis coincides with the rotation axis O. A seal member 24 is interposed between the inner periphery of the first housing element 20 and the outer periphery of the rear axle shaft 106. The seal member 24 seals the shaft insertion hole 20a.

The second housing element 21 is arranged at the middle of the housing 2 in the axial direction. The entirety of the second housing element 21 is formed of an open-end cylindrical member that is open toward both sides in the direction of the rotation axis O. A stepped inward flange 21a, which is interposed between the electric motor 4 and the reduction-transmission mechanism 5, is formed integrally with the second opening portion of the second housing element 21 (the opening portion on the first housing element 20-side). An annular member 25, to which a race is fitted, is fitted to the inner periphery of the inward flange 21a via an annular spacer 26. An annular protrusion 27, which protrudes toward the first housing element 20, is formed integrally on the second open end face of the second housing element 21 (the open end face on the first housing element 20-side). The outer periphery of the protrusion 27 has an outside diameter smaller than the maximum outside diameter of the second housing element 21. The protrusion 27 has substantially the same outside diameter as the outside diameter of the protrusion 23. The outer periphery of the protrusion 27 is formed of a cylindrical surface of which the central axis coincides with the rotation axis O.

The third housing element 22 is arranged at the first side (right side in FIG. 2) of the housing 2. The entirety of the third housing element 22 is formed of a stepped closed-end cylindrical member that is open toward the second housing element 21. The bottom of the third housing element 22 has a shaft insertion hole 22a through which the other one of the rear axle shafts 106 is passed. A cylindrical portion 22b, which protrudes toward the electric motor 4 and to which a stator is fitted, is formed integrally with the third housing element 22 so as to surround the inner opening of the shaft insertion hole 22a. A seal member 28 that seals the shaft insertion hole 22a is interposed between the inner periphery of the third housing element 22 and the outer periphery of the rear axle shaft 106.

The rear differential 3 is formed of a bevel gear differential mechanism that includes a differential case 30, a pinion gear shaft 31, a pair of pinion gears 32 and a pair of side gears 33. The rear differential 3 is arranged at the second side of the motor torque transmission device 1.

Thus, the torque of the differential case 30 is distributed from the pinion gear shaft 31 to the side gears 33 via the pinion gears 32, and further transmitted from the side gears 33 to the right and left rear wheels 105 (shown in FIG. 1) via the rear axle shafts 106 (shown in FIG. 1).

When there arises a difference in driving resistance between the right and left rear wheels 105, the torque of the differential case 30 is differentially distributed to the right and left rear wheels 105 by the rotations of the pinion gears 32.

The differential case 30 is arranged on the rotation axis O. The differential case 30 is rotatably supported by the first housing element 20 via a ball bearing 34, and is rotatably supported by a motor shaft (rotary shaft) 42 of the electric motor 4 via a ball bearing 35. The differential case 30 is configured to rotate about the rotation axis O upon reception of driving force based on the motor torque of the electric motor 4 from the reduction-transmission mechanism 5.

The differential case 30 has an accommodation space 30a and a pair of shaft insertion holes 30b. A differential mechanism unit (the pinion gear shaft 31, the pinion gears 32 and the side gears 33) is accommodated in the accommodation space 30a. The shaft insertion holes 30b communicate with the accommodation space 30a, and the right and left rear axle shafts 106 are passed through the shaft insertion holes 30b.

An annular flange 30c that faces the reduction-transmission mechanism 5 is formed integrally with the differential case 30. The flange 30c has a plurality of (six in the present embodiment) pin fitting holes 300c that are arranged at equal intervals around the rotation axis O.

The pinion gear shaft 31 is arranged along an axis L perpendicular to the rotation axis O in the accommodation space 30a of the differential case 30. Rotation of the pinion gear shaft 31 about the axis L and movement of the pinion gear shaft 31 in the direction of the axis L are restricted by a pin 36.

The pinion gears 32 are rotatably supported by the pinion gear shaft 31, and are accommodated in the accommodation space 30a of the differential case 30.

The side gears 33 each have a shaft insertion hole 33a in which a corresponding one of the rear axle shafts 106 (shown in FIG. 1) is spline-coupled. The side gears 33 are accommodated in the accommodation space 30a of the differential case 30. The side gears 33 are configured such that the gear axes are perpendicular to the gear axes of the pinion gears 32 and the side gears 33 are in mesh with the pinion gears 32.

The electric motor 4 includes a stator 40, a rotor 41 and the motor shaft 42, and is coupled, on the rotation axis O, to the rear differential 3 via the reduction-transmission mechanism 5. The stator 40 is connected to an electronic control unit (ECU) (not shown). The electric motor 4 is configured such that the stator 40 receives a control signal from the ECU, motor torque for driving the rear differential 3 is generated with the use to the stator 40 and the rotor 41, and the rotor 41 is rotated together with the motor shaft 42.

The stator 40 is arranged at the outer peripheral side of the electric motor 4, and is fitted to the inward flange 21a of the second housing element 21 with a fitting bolt 43.

The rotor 41 is arranged at the inner peripheral side of the electric motor 4, and is fitted to the outer periphery of the motor shaft 42.

The motor shaft 42 is arranged on the rotation axis O. In addition, the second end portion of the motor shaft 42 is rotatably supported by the inner periphery of the annular member 25 via a ball bearing 44 and a sleeve 45, and the first end portion of the motor shaft 42 is rotatably supported by the inner periphery of the third housing element 22 via a ball bearing 46. The entirety of the motor shaft 42 is formed of a cylindrical (hollow) shaft member through which the rear axle shafts 106 (shown in FIG. 1) is passed.

An eccentric portion 42a and an eccentric portion 42b, both of which are circular in planar view, are formed integrally with the second end portion of the motor shaft 42. The central axis of the eccentric portion 42a is an axis $O_1$ that is offset from the axis of the motor shaft 42 (rotation axis O) by an eccentric amount $\delta_1$. The central axis of the eccentric portion 42b is an axis $O_2$ that is offset from the rotation axis O by an eccentric amount $\delta_2$ ($\delta_1=\delta_2=\delta$). The eccentric portion 42a and the eccentric portion 42b are arranged so as to be next to each other along the rotation axis O and apart from each other in the circumferential direction around the rotation axis O at equal intervals) (180°). That is, the eccentric portion 42a and the eccentric portion 42b are arranged on the outer periphery of the motor shaft 42 such that the distance from the axis $O_1$ to the rotation axis O and the distance from the axis $O_2$ to the rotation axis O are equal to each other (the axes $O_1$, $O_2$ are spaced apart at an equal interval from the rotation axis O in the radial direction) and the distance between the axis $O_1$ and the axis $O_2$ in one of the circumferential directions around the rotation axis O and the distance between the axis $O_2$ and the axis $O_1$ in the other circumferential direction around the rotation axis O are equal to each other.

A resolver 47 is arranged at the first end portion of the motor shaft 42. The resolver 47 serves as a rotation angle detector, and is interposed between the outer periphery of the motor shaft 42 and the inner periphery of the cylindrical portion 22b. The resolver 47 has a stator 470 and a rotor 471, and is accommodated inside the third housing element 22. The stator 470 is fitted to the inner periphery of the cylindrical portion 22b. The rotor 471 is fitted to the outer periphery of the motor shaft 42.

A spiral groove 42c is formed in the inner periphery of the motor shaft 42. Through the groove 42c, lubricating oil is supplied from the first opening portion on the resolver 47-side (right side in FIG. 2) to the second opening portion on the rear differential 3-side (left side in FIG. 2) as the motor shaft 42 rotates.

Figure 3:
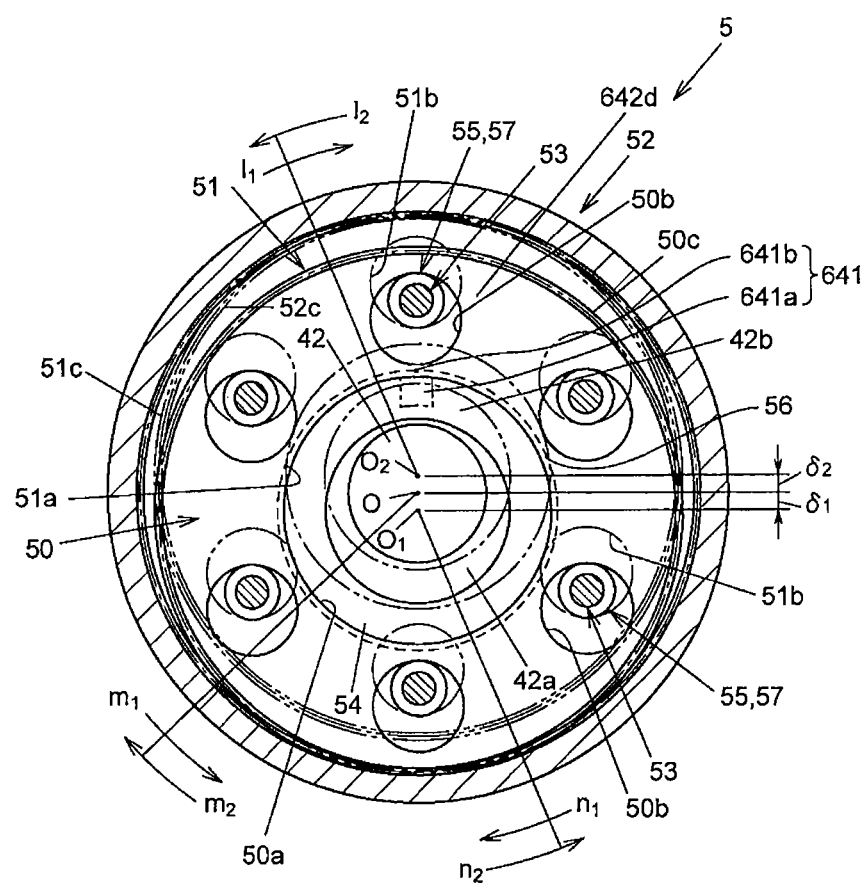
FIG. 3 is a sectional view schematically illustrating main portions of a reduction-transmission mechanism of the motor torque transmission device according to the embodiment of the invention.
Figure 4:
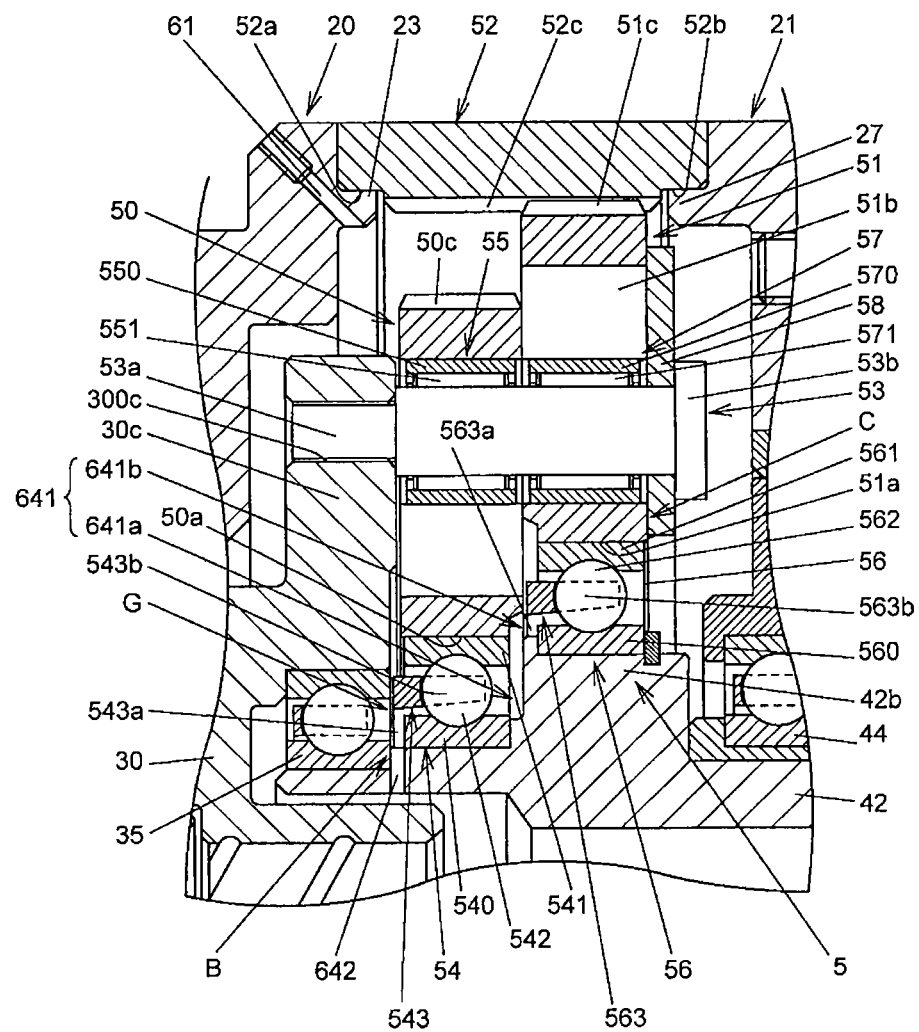
FIG. 4 is a sectional view illustrating a bearing unit of the motor torque transmission device according to the embodiment of the invention.

FIG. 3 shows the reduction-transmission mechanism. FIG. 4 shows part of oil supply passages. As shown in FIG. 2 and FIG. 3, the reduction-transmission mechanism 5 includes a speed reduction unit A, a lubricating oil supply unit B and a bearing unit C (bearing device). The reduction-transmission mechanism 5 is interposed between the rear differential 3 and the electric motor 4.

The speed reduction unit A has a pair of input members 50, 51, the rotation force applying member 52 and output members 53. The speed reduction unit A is configured to reduce the speed of rotation output from the electric motor 4 and output driving force to the rear differential 3.

The input member 50 (second input member) is formed of an external gear that has a center hole 50a of which the central axis coincides with the axis O. The input member 50 is arranged so as to be closer to the rear differential 3 than the input member 51 (first input member). In addition, the input member 50 is rotatably supported by the motor shaft 42 via a ball bearing 54 (second rolling bearing). The ball bearing 54 is interposed between the inner periphery of the input member 50, which defines the center hole 50a, and the eccentric portion 42a. The input member 50 is configured to make circular motion (revolving motion about the rotation axis O) in the directions of the arrows $m_1$, $m_2$ with the eccentric amount δ, upon reception of motor torque from the electric motor 4.

The input member 50 has a plurality of (six in the present embodiment) pin insertion holes (through-holes) 50b that are arranged at equal intervals around the axis $O_1$. The hole diameter of each pin insertion hole 50b is set to a value that is larger than a value obtained by adding the outside diameter of a needle roller bearing 55 to the outside diameter of each output member 53. External teeth 50c, having an involute tooth profile, are formed on the outer periphery of the input member 50 at a portion of which the central axis coincides with the axis $O_1$. The number $Z_1$ of the external teeth 50c is set to 195 ($Z_1$=195), for example. The outside diameter of each needle roller bearing 55 is set to a value that is smaller than the outside diameter of the ball bearing 54.

The input member 51 is formed of an external gear that has a center hole 51a of which the central axis coincides with the axis $O_2$. The input member 51 is arranged so as to be closer to the electric motor 4 than the input member 50. In addition, the input member 51 is rotatably supported by the motor shaft 42 via a ball bearing 56 (first rolling bearing). The ball bearing 56 is interposed between the inner periphery of the input member 51, which defines the center hole 51a, and the eccentric portion 42b. The input member 51 is configured to make circular motion (revolving motion about the rotation axis O) in the directions of the arrows $m_1$, $m_2$ with the eccentric amount δ, upon reception of motor torque from the electric motor 4.

The input member 51 has a plurality of (six in the present embodiment) pin insertion holes (through-holes) 51b that are arranged at equal intervals around the axis $O_2$. The hole diameter of each pin insertion hole 51b is set to a value that is larger than a value obtained by adding the outside diameter of a needle roller bearing 57 to the outside diameter of each output member 53. External teeth 51c, having an involute tooth profile, are formed on the outer periphery of the input member 51 at a portion of which the central axis coincides with the axis $O_2$. The number $Z_2$ ($Z_2$=$Z_1$) of the external teeth 51c is set to 195, for example. The outside diameter of each needle roller bearing 57 is set to a value that is smaller than the outside diameter of the ball bearing 56.

The rotation force applying member 52 is formed of an internal gear of which the central axis coincides with the rotation axis O. The rotation force applying member 52 is interposed between the first housing element 20 and the second housing element 21. The entirety of the rotation force applying member 52 is formed of an open-end cylindrical member that constitutes part of the housing 2 and that is open toward both sides in the direction of the rotation axis O. The rotation force applying member 52 is in mesh with the input members 50, 51. The rotation force applying member 52 is configured to apply rotation force in the direction of the arrow $n_1$ to the input member 50 that makes revolving motion upon reception of motor torque from the electric motor 4, and to apply rotation force in the direction of the arrow $l_1$ to the input member 51 that makes revolving motion upon reception of motor torque from the electric motor 4.

The inner periphery of the rotation force applying member 52 has a first fitting portion 52a and a second fitting portion 52b that are located at a predetermined distance in the direction of the rotation axis O. The first fitting portion 52a is fitted to the outer periphery of the protrusion 23. The second fitting portion 52b is fitted to the outer periphery of the protrusion 27. In addition, the inner periphery of the rotation force applying member 52 has internal teeth 52c having an involute tooth profile. The internal teeth 52c are located between the first fitting portion 52a and the second fitting portion 52b. The external teeth 50c of the input member 50 and the external teeth 51c of the input member 51 are in mesh with the internal teeth 52c. The number $Z_3$ of the internal teeth 52c is set to 208, for example. Thus, the reduction gear ratio α of the reduction-transmission mechanism 5 is calculated according to an equation, $\alpha = Z_2/(Z_3 - Z_2)$.

The output members 53 are a plurality of (six in the present embodiment) bolts each having a threaded portion 53a at one end and a head 53b at the other end. The threaded portions 53a of the output members 53 are passed through the pin insertion holes 50b of the input member 50 and the pin insertion holes 51b of the input member 51 and then fitted in the pin fitting holes 300c of the differential case 30. In addition, the output members 53 are arranged so as to be passed through an annular spacer 58 that is interposed between each head 53b and the input member 51. The output members 53 are configured to receive rotation force, applied by the rotation force applying member 52, from the input members 50, 51 and output the rotation force to the differential case 30 as the torque of the differential case 30.

The needle roller bearing 55 and the needle roller bearing 57 are fitted to the outer periphery of each output member 53 at a portion between the threaded portion 53a and the head 53b. The needle roller bearing 55 reduces contact resistance between each output member 53 and the inner periphery, which defines the corresponding pin insertion hole 50b of the input member 50. The needle roller bearing 57 reduces contact resistance between each output member 53 and the inner periphery, which defines the corresponding pin insertion hole 51b of the input member 51.

The needle roller bearings 55 each have a race 550 and needle rollers 551. The race 550 is able to contact the inner periphery, which defines a corresponding one of the pin insertion holes 50b of the input member 50. The needle rollers 551 roll between the race 550 and the outer periphery of a corresponding one of the output members 53. The needle roller bearings 57 each have a race 570 and needle rollers 571. The race 570 is able to contact the inner periphery, which defines a corresponding one of the pin insertion holes 51b of the input member 51. The needle rollers 571 roll between the race 570 and the outer periphery of a corresponding one of the output members 53.

The lubricating oil supply unit B includes an oil tank (not shown), oil delivery passages 61, 62, an oil introduction passage 63 and an oil supply passage 64. The lubricating oil supply unit B is configured such that the lubricating oil is supplied to the ball bearings 54, 56, and the like, through the oil supply passage 64 by centrifugal force generated in accordance with the rotation of the motor shaft 42.

The oil delivery passages 61, 62 are open toward the inside and outside of the housing 2, and communicate with the oil tank via tube members (not shown). The oil delivery passages 61, 62 are formed in the first housing element 20 at equal intervals around the rotation axis O. The oil delivery passages 61, 62 are configured such that, through the delivery passages 61, 62, the lubricating oil inside the housing 2 is delivered to the outside of the housing 2 and the lubricating oil is caused to flow toward the oil tank with the use of, for example, a pump.

The oil introduction passage 63 functions as an oil passage that extends from the oil tank to the oil supply passage 64, and is formed in the third housing element 22 with a portion thereof exposed on the outside of the housing 2. The oil introduction passage 63 is configured such that the lubricating oil in the oil tank flows through the oil introduction passage 63 to be introduced into the oil supply passage 64.

The oil supply passage 64 has a first oil supply passage 640, a second oil supply passage 641 and a third oil supply passage 642. The oil supply passage 64 is formed in the motor shaft 42 and the input member 50.

The first oil supply passage 640 communicates with the groove 42c of the motor shaft 42, and functions as an oil passage that extends from the oil introduction passage 63 to the third oil supply passage 642. The first oil supply passage 640 is formed in the motor shaft 42.

The second oil supply passage 641 has, for example, an oil flow passage 641a (first oil flow passage) and an oil flow passage 641b (second oil flow passage). The oil flow passage 641a is formed in the eccentric portion 42b. The oil flow passage 641b is formed in the input member 50. The second oil supply passage 641 is configured such that the lubricating oil is supplied from the ball bearing 54-side to the ball bearing 56 by centrifugal force generated in accordance with the rotation of the motor shaft 42.

The oil flow passage 641a is formed in the eccentric portion 42b, and is open between an inner ring 540 and an outer ring 541 of the ball bearing 54. The oil flow passage 641b is formed in the input member 50, and is open between an inner ring 560 and an outer ring 561 of the ball bearing 56.

The third oil supply passage 642 functions as an oil passage that extends from the first oil supply passage 640 to a space G between the ball bearing 54 and the ball bearing 35. The third oil supply passage 642 is formed in the motor shaft 42 so as to open at the inner periphery and outer periphery of the motor shaft 42. The third oil supply passage 642 is configured to supply lubricating oil from the first oil supply passage 640 to the space G by centrifugal force generated in accordance with the rotation of the motor shaft 42.

The bearing unit C includes the ball bearings 54, 56, and is arranged on the outer periphery of the motor shaft 42. The bearing unit C is configured such that the ball bearing 54 is interposed between the inner periphery of the input member 50, which defines the center hole 50a, and the outer periphery of the eccentric portion 42a to support the input member 50 such that the input member 50 is rotatable relative to the motor shaft 42. In addition, the bearing unit C is configured such that the ball bearing 56 is interposed between the inner periphery of the input member 51, which defines the center hole 51a, and the outer periphery of the eccentric portion 42b to support the input member 51 such that the input member 51 is rotatable relative to the motor shaft 42.

The ball bearing 54 includes the inner ring 540, the outer ring 541, a plurality of rolling elements 542 and a cage 543. The ball bearing 54 is formed of, for example, a deep groove ball bearing. The rolling elements 542 roll between a first raceway (inner raceway) of the inner ring 540 and a second raceway (outer raceway) of the outer ring 541. The rolling elements 542 are rollably retained by the cage 543 at equal intervals around the central axis $O_1$ (shown in FIG. 2).

As shown in FIG. 4, the cage 543 has an annular base portion 543a and a plurality of partition wall portions 543b. The base portion 543a is interposed between the inner ring 540 and the outer ring 541. The partition wall portions 543b are used to form pockets together with the base portion 543a. Part of the base portion 543a protrudes axially outward (outward of the inner ring 540 and the outer ring 541) from the end face (inner raceway) of the inner ring 540, and forms an oil receiving portion that receives the lubricating oil from the third oil supply passage 642. The base portion 543a is arranged at the second side (left side in FIG. 4) of the cage 543. The partition wall portions 543b are arranged at the first side (right side in FIG. 4) of the cage 543 at equal intervals in the circumferential direction of the base portion 543a. In addition, the dimensions of the cage 543 are set such that the inner diameter gradually increases from a second axial end portion toward a first axial end portion except for the pockets. The cage 543 may be, for example, a snap cage.

The ball bearing 56 includes the inner ring 560, the outer ring 561, a plurality of rolling elements 562 and a cage 563. The ball bearing 56 is formed of, for example, a deep groove ball bearing. The rolling elements 562 roll between a first raceway (inner raceway) of the inner ring 560 and a second raceway (outer raceway) of the outer ring 561. The rolling elements 562 are rollably retained by the cage 563 at equal intervals around the central axis $O_1$ (shown in FIG. 2).

The cage 563 has an annular base portion 563a and a plurality of partition wall portions 563b. The base portion 563a is interposed between the inner ring 560 and the outer ring 561. The partition wall portions 563b are used to form pockets together with the base portion 563a. Part of the base portion 563a protrudes axially outward (outward of the inner ring 560 and the outer ring 561) from the end face (inner raceway) of the inner ring 560, and forms an oil receiving portion that receives the lubricating oil from the ball bearing 54-side, at a portion around the rotation axis O (shown in the drawing) and axially outward of the ball bearing 56. The base portion 563a is arranged at the second side (left side in FIG. 4) of the cage 563. The partition wall portions 563b are arranged at the first side (right side in FIG. 4) of the cage 563 at equal intervals in the circumferential direction of the base portion 563a. In addition, the dimensions of the cage 563 are set such that the inner diameter gradually increases from a second axial end portion toward a first axial end portion except for the pockets. The cage 563 may be, for example, a snap cage.

Next, the operation of the motor torque transmission device according to the present embodiment will be described with reference to FIG. 1 to FIG. 4. Referring to FIG. 2, when electric power is supplied to the electric motor 4 of the motor torque transmission device 1 to drive the electric motor 4, the motor torque of the electric motor 4 is applied to the reduction-transmission mechanism 5 via the motor shaft 42. Thus, the reduction-transmission mechanism 5 is driven.

Therefore, in the reduction-transmission mechanism 5, the input members 50, 51 each make circular motion with the eccentric amount 6, for example, in the direction of the arrow $m_1$ shown in FIG. 3.

Accordingly, the input member 50 rotates about the axis $O_1$ (in the direction of the arrow $n_1$ shown in FIG. 3) while the external teeth 50c are meshed with the internal teeth 52c of the rotation force applying member 52, and the input member 51 rotates about the axis $O_2$ (in the direction of the arrow shown in FIG. 3) while the external teeth 51c are meshed with the internal teeth 52c of the rotation force applying member 52. In this case, due to the rotation of the input members 50, 51, the inner peripheries, which define the pin insertion holes 50b, contact the races 550 of the corresponding needle roller bearings 55, and the inner peripheries, which define the pin insertion holes 51b, contact the races 570 of the corresponding needle roller bearings 57.

Therefore, the revolving motions of the input members 50, 51 are not transmitted to the output members 53 and only the rotation motions of the input members 50, 51 are transmitted to the output members 53. Rotation force resulting from the rotation motions is output from the output members 53 to the differential case 30 as the torque of the differential case 30.

Thus, the rear differential 3 is driven, and driving force based on the motor torque of the electric motor 4 is distributed to the rear axle shafts 106 shown in FIG. 1 and transmitted to the right and left rear wheels 105.

In the motor torque transmission device 1, when the motor shaft 42 of the electric motor 4 rotates, flow of the lubricating oil from the oil introduction passage 63-side of the first oil supply passage 640 toward the third oil supply passage 642 is formed in accordance with the rotation of the motor shaft 42, and centrifugal force acts on the lubricating oil in the first oil supply passage 640.

Therefore, after the lubricating oil introduced from the oil introduction passage 63 to the first oil supply passage 640 flows through the first oil supply passage 640, the lubricating oil flows through the third oil supply passage 642 as shown in FIG. 4, and is supplied to the space G between the ball bearing 54 and the ball bearing 35. In this case, in the ball bearing 54, the lubricating oil supplied to the space G is received by the base portion 543a of the cage 543.

Thus, the lubricating oil flows from the base portion 543a of the cage 543 to a space between the inner ring 540 and the outer ring 541, flows between the inner ring 540 and the outer ring 541, and is discharged from the ball bearing 54.

Then, the lubricating oil discharged from the ball bearing 54 flows into the second oil supply passage 641 (oil flow passages 641a, 641b), flows through the oil flow passages 641a, 641b, and is supplied to the ball bearing 56. In this case, in the ball bearing 56, the base portion 563a of the cage 563 receives the lubricating oil.

Thus, the lubricating oil flows from the base portion 563a of the cage 563 to a space between the inner ring 560 and the outer ring 561, flows between the inner ring 560 and the outer ring 561, and is discharged from the ball bearing 56.

Thus, in the present embodiment, the lubricating oil is supplied to the ball bearings 54, 56 by the lubricating oil supply unit B to lubricate the ball bearings 54, 56.

Note that, in the above-described embodiment, the case where the input members 50, 51 are caused to make circular motions in the direction of the arrow $m_1$ to drive the motor torque transmission device 1 is described. However, the motor torque transmission device 1 may be driven as in the case of the above-described embodiment even when the input members 50, 51 are caused to make circular motions in the direction of the arrow m2. In this case, the rotation motion of the input member 50 is made in the direction of the arrow $n_2$, and the rotation motion of the input member 51 is made in the direction of the arrow $l_2$.

According to the above described embodiment, the following advantageous effects are obtained.

It is possible to increase the amount of lubricating oil that is supplied to the inner side (ball bearings 54, 56) in the direction perpendicular to the rotation axis O. Therefore, it is possible to supply a sufficient amount of lubricating oil to the ball bearings 54, 56.

The bearing device, the speed reduction mechanism including the bearing device, and the motor torque transmission device according to the invention are described on the basis of the above-described embodiment. However, the invention is not limited to the above-described embodiment. The invention may be implemented in various other embodiments without departing from the scope of the invention, and, for example, the invention may be implemented in the following alternative embodiments.

(1) In the above-described embodiment, the two ball bearings 54, 56 are used to support the input members 50, 51 such that the input members 50, 51 are rotatable relative to the motor shaft 42 (eccentric portions 42a, 42b); however, the invention is not limited to this configuration. Of course, the number of bearings is determined on the basis of the number of the input members.

Figure 5:
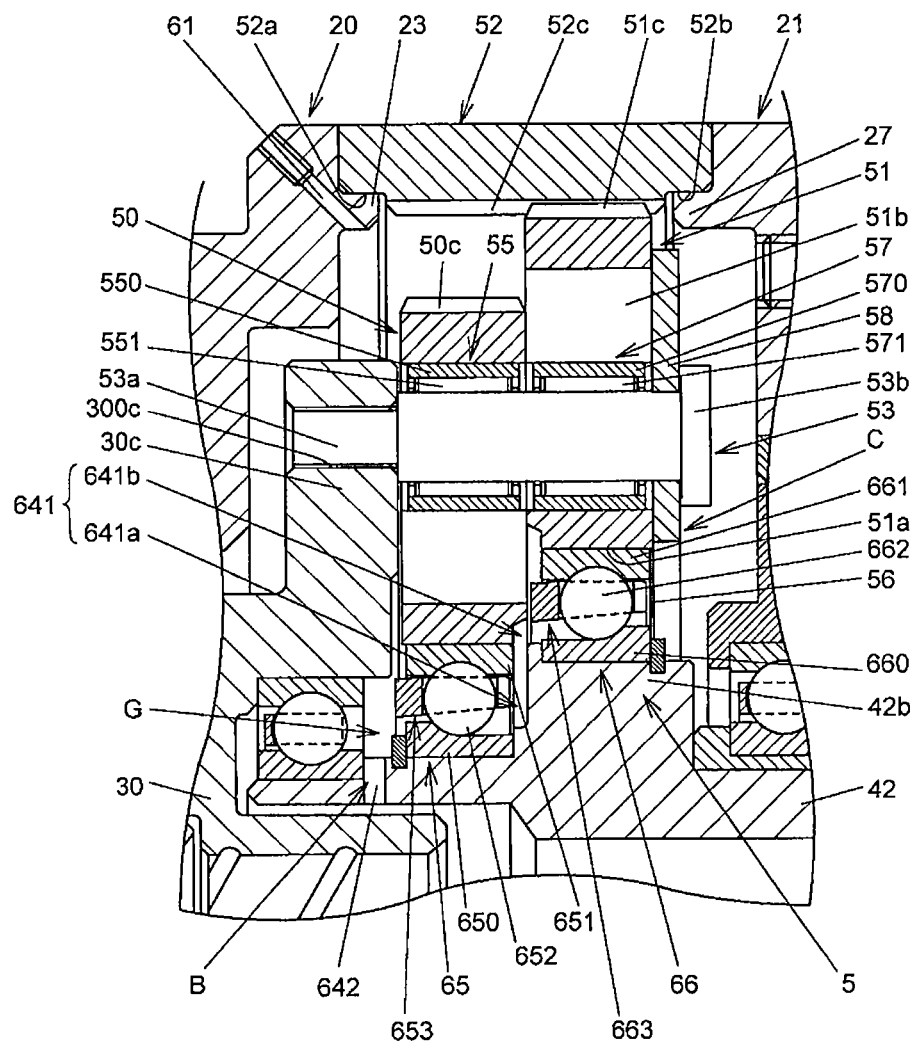
FIG. 5 is a sectional view illustrating a bearing unit of the motor torque transmission device according to a first modified example of the embodiment of the invention.

(2) In the above-described embodiment, the ball bearing 54 includes the cage 543 formed of a snap cage, the ball bearing 56 includes the cage 563 formed of a snap cage, and the ball bearings 54, 56 are formed of deep groove ball bearings. However, the invention is not limited to this configuration. As shown in FIG. 5, ball bearings 65, 66 formed of angular contact ball bearings may be used. In FIG. 5, the ball bearing 65 includes an inner ring 650, an outer ring 651, a plurality of rolling elements 652 and a cage 653. The cage 653 is formed of a window-type cage, and the rolling elements 652 are rollably retained by the cage 653 at equal intervals in the circumferential direction. The rolling elements 652 roll between a first raceway (inner raceway) of the inner ring 650 and a first raceway (inner raceway) of the outer ring 651. The cage 653 is formed of a window-type cage that retains the rolling elements 652 at equal intervals in the circumferential direction such that the rolling elements 652 are rollable. The dimensions of the cage 653 are set such that a second axial end portion protrudes axially outward from the end face (inner raceway) of the inner ring 650 and the inner diameter gradually increases from the second axial end portion toward a first axial end portion except for the pockets.

Similarly, the ball bearing 66 includes an inner ring 660, an outer ring 661, a plurality of rolling elements 662 and a cage 663. The cage 662 is formed of a window-type cage, and the rolling elements 662 are rollably retained by the cage 663 at equal intervals in the circumferential direction. The rolling elements 662 roll between the first raceway (inner raceway) of the inner ring 660 and the first raceway (outer raceway) of the outer ring 661. The cage 663 is formed of a window-type cage, and the rolling elements 662 are rollably retained by the cage 663 at equal intervals in the circumferential direction.

The dimensions of the cage 663 are set such that a second axial end portion protrudes axially outward from the end face (inner raceway) of the inner ring 660 and the inner diameter gradually increases from the second axial end portion toward a first axial end portion except for the pockets.

Figure 6:
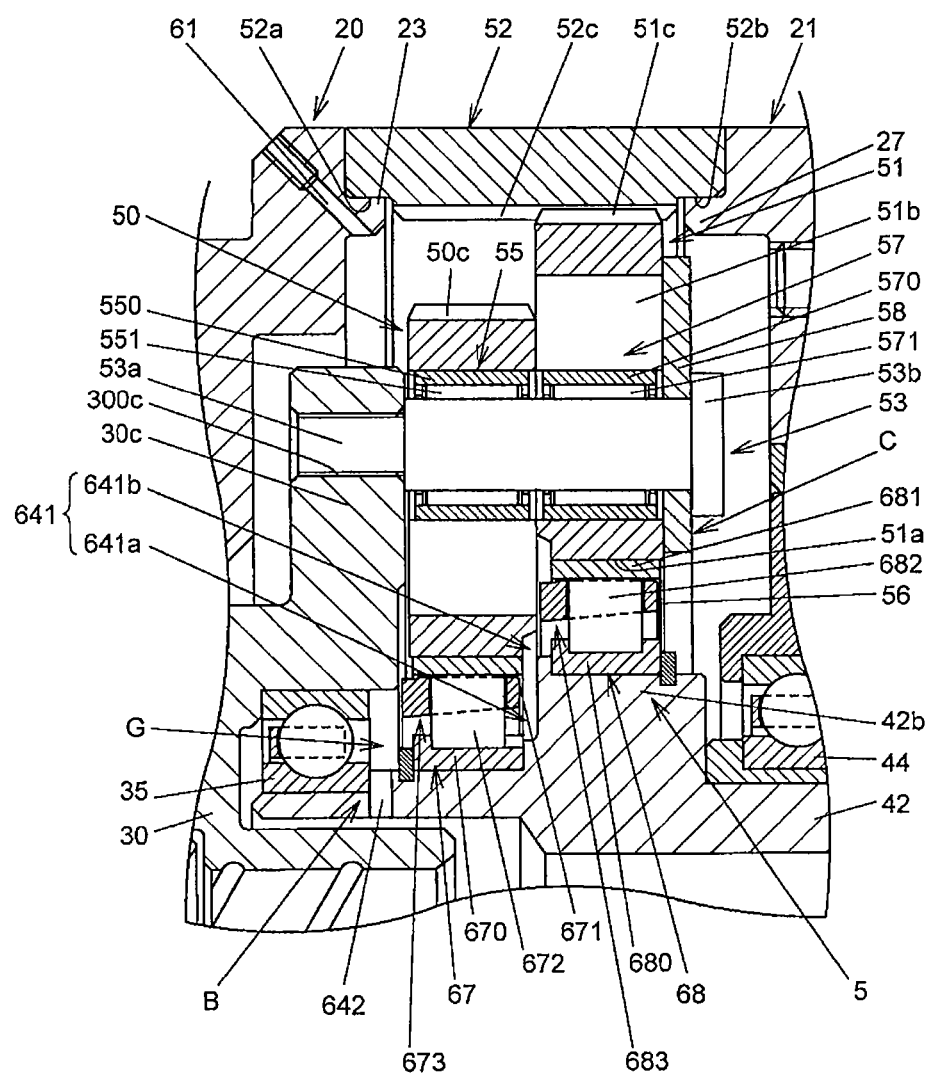
FIG. 6 is a sectional view illustrating a bearing unit of the motor torque transmission device according to a second modified example of the embodiment of the invention.

In addition, according to the invention, needle roller bearings or long roller bearings may be used instead of the ball bearings 54, 56, and cylindrical roller bearings 67, 68 may be used as shown in FIG. 6. In FIG. 6, the cylindrical roller bearing 67 includes an inner ring 670, an outer ring 671, a plurality of rolling elements 672 and a cage 673. The cage 673 is formed of a window-type cage, and the rolling elements 672 are rollably retained by the cage 673 at equal intervals in the circumferential direction. The rolling elements 672 roll between a first raceway (inner raceway) of the inner ring 670 and a second raceway (outer raceway) of the outer ring 671. The cage 673 is formed of a window-type cage, and the rolling elements 672 are rollably retained by the cage 673 at equal intervals in the circumferential direction. The dimensions of the cage 673 are set such that a second axial end portion protrudes axially outward from the end face (inner raceway) of the inner ring 670 and the inner diameter gradually increases from the second axial end portion toward a first axial end portion except for the pockets.

Similarly, the cylindrical roller bearing 68 includes an inner ring 680, an outer ring 681, a plurality of rolling elements 682 and a cage 683. The rolling elements 682 roll between a first raceway (inner raceway) of the inner ring 680 and a second raceway (outer raceway) of the outer ring 681. The cage 683 is formed of a window-type cage, and the rolling elements 682 are rollably retained by the cage 683 at equal intervals in the circumferential direction. The dimensions of the cage 683 are set such that a second axial end portion protrudes axially outward from the end face (inner raceway) of the inner ring 680 and the inner diameter gradually increases from the second axial end portion toward a first axial end portion except for the pockets.

(3) In the above-described embodiment, the eccentric portion 42a and the eccentric portion 42b are arranged on the outer periphery of the motor shaft 42 such that the distance from the axis $O_1$ of the center hole 50a to the rotation axis O and the distance from the axis $O_2$ of the center hole 51a to the rotation axis O are equal to each other and the distance between the axis $O_1$ of the center hole 50a and the axis $O_2$ of the center hole 51a in one of the circumferential directions around the rotation axis O and the distance between the axis $O_2$ of the center hole 51a and the axis $O_1$ of the center hole 50a in the other circumferential direction around the rotation axis O are equal to each other. Further, the motor shaft 42 of the electric motor 4 is provided with the input members 50, 51 at portions that are apart from each other in the circumferential direction around the axis of the motor shaft 42 (rotation axis O) at equal intervals (180°). The input members 50, 51 are arranged so as to correspond to the eccentric portions 42a, 42b, respectively. However, the invention is not limited to this configuration, and the number of the input members may be changed as needed.

That is, when the number of the input members is n (n≥3), the axis of the first eccentric portion, the axis of the second eccentric portion, . . . , and the axis of the nth eccentric portion are successively arranged in one direction about the axis of the motor shaft on an imaginary plane that is perpendicular to the axis of the electric motor (motor shaft). In this case, the eccentric portions are arranged around the motor shaft such that the distance from the axis of each eccentric portion to the axis of the motor shaft is equal to one another and an angle formed between line segments that connect the axis of the motor shaft to the respective axes of any adjacent two eccentric portions among the first eccentric portion, the second eccentric portion, . . . , and the nth eccentric portion is set to 360°/n. Furthermore, the n input members are arranged on the motor shaft at portions that are spaced at intervals of 360°/n about the axis of the motor shaft so as to correspond to the respective eccentric portions.

For example, when the number of the input members is three, the axis of the first eccentric portion, the axis of the second eccentric portion and the axis of the third eccentric portion are successively arranged in one direction around the axis of the motor shaft on an imaginary plane that is perpendicular to the axis of the motor shaft. In this case, the eccentric portions are arranged around the motor shaft such that the distance from the axis of each eccentric portion to the axis of the motor shaft is equal to one another and an angle formed between line segments that connect the axis of the motor shaft to the respective axes of any adjacent two eccentric portions among the first eccentric portion, the second eccentric portion and the third eccentric portion is set to 120°. Furthermore, the three input members are arranged on the motor shaft at portions that are spaced at intervals of 120° about the axis of the motor shaft so as to correspond to the first eccentric portion, the second eccentric portion and the third eccentric portion.

(4) In the above-described embodiment, the case where the invention is applied to the four-wheel drive vehicle 101 that uses both the engine 102 and the electric motor 4 as the driving sources is described. However, the invention is not limited to this configuration. The invention may also be applied to an electric vehicle, which is a four-wheel drive vehicle or a two-wheel drive vehicle, using only an electric motor as a driving source. In addition, the invention may also be applied to a four-wheel drive vehicle that has a first drive shaft driven by an engine and an electric motor and a second drive shaft driven by an electric motor, as in the case of the above-described embodiment.

(5) In the above-described embodiment, the description is made on the case where the needle roller bearing 55 that is able to contact the inner periphery, which defines a corresponding one of the pin insertion holes 50b of the input member 50, is fitted to the outer periphery of each of the output members 53 at a portion between the threaded portion 53a and the head 53b, and the needle roller bearing 57 that is able to contact the inner periphery, which defines a corresponding one of the pin insertion holes 51b of the input member 51, is fitted to the outer periphery of each of the output members 53 at a portion between the threaded portion 53a and the head 53b. However, the invention is not limited to this configuration. A roller bearing other than a needle roller bearing or a ball bearing may be used instead of the needle roller bearing. Such a ball bearing or a roller bearing may be, for example, a deep groove ball bearing, an angular contact ball bearing, a long cylindrical roller bearing, a cylindrical roller bearing, a tapered roller bearing, a spherical roller bearing, or the like. In addition, according to the invention, a plain bearing may be used instead of a rolling bearing.

According to the invention, the amount of lubricating oil at the inner side in the direction perpendicular to the rotation axis is increased, and it is possible to supply a sufficient amount of lubricating oil to the bearings near the rotation axis.

What is claimed is:

1. A bearing device, comprising:
a rotary shaft that has at least two eccentric portions that are arranged at equal intervals around a rotation axis of the rotary shaft, and that have respective central axes that are spaced apart at equal interval from the rotation axis in a radial direction of the rotary shaft; and
at least two rolling bearings that include a first rolling bearing and a second rolling bearing, that are respectively arranged on outer peripheries of the at least two eccentric portions of the rotary shaft, and each of which includes a plurality of rolling elements that roll between an inner raceway and an outer raceway and a cage by which the rolling elements are rollably retained at equal intervals around the corresponding central axis, wherein
the cage of each of the at least two rolling bearings has an annular base portion that is interposed between the inner raceway and the outer raceway and a plurality of partition wall portions for forming pockets together with the base portion, and
in the first rolling bearing, part of the base portion protrudes axially outward from the inner raceway and forms an oil receiving portion that receives lubricating oil from the second rolling bearing side, at a portion around the rotation axis and axially outward of the first rolling bearing.

2. The bearing device according to claim 1, wherein:
the rotary shaft is formed of a hollow shaft member that has an oil supply passage that is open at an inner periphery and an outer periphery of the hollow shaft member; and
each of the at least two rolling bearings is formed such that, in the second rolling bearing, part of the base portion protrudes axially outward from the inner raceway and forms an oil receiving portion that receives lubricating oil from the oil supply passage.

3. A speed reduction mechanism, comprising:
a speed reduction unit that includes input members and outputs member, and that reduces a speed of rotation input into the input members and outputs the rotation with a reduced speed from the output members; and
a bearing unit by which the input members of the speed reduction unit are rotatably supported around respective central axes of the input members, wherein
the bearing unit is the bearing device according to claim 1, and
the input members of the speed reduction unit include a first input member that is supported by the first rolling bearing, and a second input member that is supported by the second rolling bearing.

4. A speed reduction mechanism, comprising:
a speed reduction unit that includes input members and outputs member, and that reduces a speed of rotation input into the input members and outputs the rotation with a reduced speed from the output members; and a bearing unit by which the input members of the speed reduction unit are rotatably supported around respective central axes of the input members, wherein the bearing unit is the bearing device according to claim 2, and the input members of the speed reduction unit include a first input member that is supported by the first rolling bearing, and a second input member that is supported by the second rolling bearing.

5. The speed reduction mechanism according to claim 3, wherein:

in the bearing unit, the rotary shaft has a first oil flow passage that is open at a position between the inner raceway and the outer raceway of the second rolling bearing; and in the speed reduction unit, the second input member has a second oil flow passage that communicates with the first oil flow passage and that is open at a position between the inner raceway and the outer raceway in the first rolling bearing.

6. The speed reduction mechanism according to claim 4, wherein:

in the bearing unit, the rotary shaft has a first oil flow passage that is open at a position between the inner raceway and the outer raceway of the second rolling bearing; and in the speed reduction unit, the second input member has a second oil flow passage that communicates with the first oil flow passage and that is open at a position between the inner raceway and the outer raceway in the first rolling bearing.

7. A motor torque transmission device, comprising:

an electric motor that generates motor torque; and a reduction-transmission mechanism that reduces a speed of rotation of the electric motor and transmits driving force to a driving force transmitted target, wherein the reduction-transmission mechanism is the speed reduction mechanism according to claim 3.

8. A motor torque transmission device, comprising:

an electric motor that generates motor torque; and a reduction-transmission mechanism that reduces a speed of rotation of the electric motor and transmits driving force to a driving force transmitted target, wherein the reduction-transmission mechanism is the speed reduction mechanism according to claim 4.

9. A motor torque transmission device, comprising:

an electric motor that generates motor torque; and a reduction-transmission mechanism that reduces a speed of rotation of the electric motor and transmits driving force to a driving force transmitted target, wherein the reduction-transmission mechanism is the speed reduction mechanism according to claim 5.

10. A motor torque transmission device, comprising:

an electric motor that generates motor torque; and a reduction-transmission mechanism that reduces a speed of rotation of the electric motor and transmits driving force to a driving force transmitted target, wherein the reduction-transmission mechanism is the speed reduction mechanism according to claim 6.

11. The motor torque transmission device according to claim 7, wherein the reduction-transmission mechanism transmits the driving force to a differential mechanism that serves as the driving force transmitted target.

12. The motor torque transmission device according to claim 8, wherein the reduction-transmission mechanism transmits the driving force to a differential mechanism that serves as the driving force transmitted target.

13. The motor torque transmission device according to claim 9, wherein the reduction-transmission mechanism transmits the driving force to a differential mechanism that serves as the driving force transmitted target.

14. The motor torque transmission device according to claim 10, wherein the reduction-transmission mechanism transmits the driving force to a differential mechanism that serves as the driving force transmitted target.

\* \* \* \* \*